US012152362B2

(12) United States Patent
Curtis

(10) Patent No.: US 12,152,362 B2
(45) Date of Patent: Nov. 26, 2024

(54) BULWARK STRUCTURE AND METHOD

(71) Applicant: Mark Robert Edmund Curtis, Beecroft (AU)

(72) Inventor: Mark Robert Edmund Curtis, Beecroft (AU)

( * ) Notice: Subject to any disclaimer, the term of this patent is extended or adjusted under 35 U.S.C. 154(b) by 0 days.

(21) Appl. No.: 18/116,495

(22) Filed: Mar. 2, 2023

(65) Prior Publication Data

US 2023/0279631 A1 Sep. 7, 2023

Related U.S. Application Data

(63) Continuation of application No. 16/339,680, filed as application No. PCT/AU2017/000207 on Oct. 4, 2017, now abandoned.

(30) Foreign Application Priority Data

Oct. 4, 2016 (AU) ................................ 2016238840

(51) Int. Cl.
*E02D 29/02* (2006.01)
*B09B 1/00* (2006.01)
(Continued)

(52) U.S. Cl.
CPC ................ *E02D 17/18* (2013.01); *B09B 1/00* (2013.01); *B65G 5/00* (2013.01); *E02D 29/0266* (2013.01);
(Continued)

(58) Field of Classification Search
CPC ............ E02D 29/0275; E02D 29/0241; E02D 29/0233; E02D 29/0225
See application file for complete search history.

(56) References Cited

U.S. PATENT DOCUMENTS 3,419,916 A * 1/1969 Schankler ............... E04H 4/142
428/33
3,869,868 A 3/1975 Irsai
(Continued)

FOREIGN PATENT DOCUMENTS

CN 204356797 U 5/2015
DE 3714664 A1 11/1988
(Continued)

OTHER PUBLICATIONS

International Preliminary Report on Patentability dated Feb. 4, 2019 issued in connection with corresponding International Patent Application No. PCT/AU2017/000207.
(Continued)

*Primary Examiner* — Sunil Singh
(74) *Attorney, Agent, or Firm* — LADAS & PARRY LLP

(57) ABSTRACT

A bund system for the retention of solid or liquid or pourable waste material; bunds of the bund system comprising retaining structures; the retaining structures including at least one vertical structural element relative a base; the base covering a portion of a ground surface; the bunds maintained in a selected position on the ground surface by interaction of the retaining elements with a mass of compacted material.

Also disclosed is a method of forming a waste retention area by enclosing the waste retention area by bunds; the bunds comprising at least one substantially vertical retaining structure relative a base extending over a portion of a ground surface; the method including the steps of;
 positioning retaining structures on the ground surface to form an enclosed area; horizontal base panels of the retaining structures facing inwards to the enclosed area,
 welding overlap portions of sealing elements at adjacent vertical and horizontal joints between adjoining retaining structures, (Continued)

placing an impervious liner over the ground surface of the enclosed area, welding edges of the impervious liner to edges of sealing elements at inward edges of the horizontal base panels.

13 Claims, 11 Drawing Sheets

(51) Int. Cl.
*B65G 5/00* (2006.01)
*E02D 17/18* (2006.01)

(52) U.S. Cl.
CPC ...... *E02D 29/0225* (2013.01); *E02D 29/0233* (2013.01)

(56) References Cited

U.S. PATENT DOCUMENTS

| | | |
|---|---|---|
| 4,290,246 A | 9/1981 | Hilsey |
| 2003/0021630 A1* | 1/2003 | Norman .................. E03F 1/002 |
| | | 405/52 |
| 2011/0252557 A1* | 10/2011 | Oat .......................... E04H 4/00 |
| | | 523/132 |
| 2016/0122999 A1 | 5/2016 | Curtis |

FOREIGN PATENT DOCUMENTS

| | | | |
|---|---|---|---|
| EP | 0079880 | * | 5/1983 |
| FR | 2279908 | * | 2/1976 |
| GB | 2460342 A | | 12/2009 |
| JP | 5-280055 A | | 10/1993 |
| WO | 98/51865 A1 | | 11/1998 |
| WO | WO 2014205495 | * | 10/2014 |
| WO | 2016025974 A1 | | 2/2016 |

OTHER PUBLICATIONS

Extended European Search Report dated Oct. 15, 2020 issued in connection with corresponding European patent Application No. EP 17857686.4.

International Search Report (ISR) dated Feb. 1, 2018 for Application No. PCT/AU2017/000207.

Written Opinion (WO) dated Feb. 1, 2018 for Application No. PCT/AU2017/000207.

* cited by examiner

BULWARK STRUCTURE AND METHOD

RELATED APPLICATION INFORMATION

This application is a CONTINUATION of application Ser. No. 16/339,680 filed on Apr. 4, 2019, which is a 371 of International Application PCT/AU2017/000207 filed Oct. 4, 2017, which claims priority from Australia Application No. 2016238840 filed Oct. 4, 2016, the disclosures of which are incorporated in their entirety by reference herein.

TECHNICAL FIELD

The present invention relates to retaining structures and, more particularly although not exclusively, to structures for retaining waste material.

BACKGROUND

It is known to prepare landfill sites or containment dam structure for waste material by the formation of surrounding raised earth formations or bunds. Typically the area enclosed is provided with an impervious liner to prevent contaminated water or other liquid entering and polluting ground water and, ultimately entering natural stream and river systems.

A major disadvantage of this type of retaining structure, as is illustrated in FIG. 1 (prior art), is the large footprint demanded by the bund formations. A further associated disadvantage is the large area of the sloping bund walls which must be covered with the expensive impervious liner material which can be easily damaged.

It is an object of the present invention to address or at least ameliorate some of the above disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly, in a first broad form of the invention, there is provided a bund system for the retention of solid or liquid or pourable waste material; bunds of the bund system comprising retaining structures; the retaining structures including at least one vertical structural element relative a base; the base covering a portion of a ground surface; the bunds maintained in a selected position on the ground surface by interaction of the retaining elements with a mass of compacted material.

Preferably, the retaining structures comprise a double row of spaced apart, substantially vertical panels; the substantially vertical panels maintained in substantially vertical and spaced apart position on the ground surface by retaining elements projecting from each row of the double row of panels towards an opposite row; the retaining structures maintained in the selected position by the mass of compacted material back-filled between the spaced apart, substantially vertical panels.

Preferably, at least a proportion of the retaining elements interconnect selected opposing panels of the double row of spaced apart, substantially vertical panels.

Preferably, each of the retaining elements extends from the spaced apart, substantially vertical panels across a portion of the spacing between the double row of panels.

Preferably, the retaining elements are rods affixed at a first proximate ends at an inward facing surface of the spaced apart, substantially vertical panels; a second distal ends of each of the rods provided with a projecting structure extending beyond a periphery of the distal end of the rod.

Preferably, the projecting structure forms a soil anchor.

Preferably, the projecting structure is adapted for a bolted connection to anchor points provided at inward facing surfaces of the spaced apart, substantially vertical panels.

Preferably, adjacent vertical edges of adjoining inward facing panels of the spaced apart, substantially vertical panels are respectively provided with one of two forms of flexible sealing elements; a first form comprising a strip of flexible polymer material overlaying a surface section of a first panel proximate an adjacent vertical edge of the first panel; a second form comprising a strip of flexible polymer material overlaying a surface portion of a second panel proximate an adjacent vertical edge of the second panel and including an overlap portion extending past the adjacent vertical edge of the second panel; the overlap portion of the second panel heat welded to the strip of flexible polymer overlaying the surface portion of the first panel.

Preferably, the retaining structures comprise a substantially horizontal base element and a substantially vertical element extending from the substantially horizontal base element.

Preferably, the substantially vertical element extends from proximate an edge of the substantially horizontal element to form substantially "L"-shaped retaining structures including a horizontal base panel and a vertical panel.

Preferably, waste material is retained between opposing lines of the substantially "L"-shaped retaining structures; the opposing lines arranged with the horizontal panels facing inwards one to another.

Preferably, the retaining structures comprise inverted "T"-shaped retaining structures; the "T"-shaped retaining structures each comprising a substantially horizontal base panel and a substantially vertical panel extending from the base panel intermediate outer edges of the substantially horizontal base panel.

Preferably, adjacent vertical and horizontal edges of adjoining retaining structures are respectively provided with one of two forms of flexible sealing elements; a first form comprising a strip of flexible polymer material overlaying surface sections of a first retaining structure proximate adjacent vertical and horizontal edges of the first retaining structure; a second form comprising a strip of flexible polymer material overlaying surface portions of a second retaining structure proximate adjacent vertical and horizontal edges of the second retaining structure and including an overlap portion extending past the adjacent vertical edge of the second retaining structure; the overlap portion of the second retaining structure heat welded to the strip of flexible polymer overlaying the surface portion of the first retaining structure.

Preferably, a waste retention area is surrounded by the bunds; an impervious liner extending across a ground surface of the waste retention area and extending up inward facing surfaces of the substantially vertical structural elements.

Preferably, a waste retention area is surrounded by the bunds; an impervious liner extending across a ground surface of the waste retention area; outer edges of the impervious liner welded to seal elements provided along lower edges of the substantially vertical structural elements.

Preferably, the retaining structures are formed of precast concrete.

In another broad form of the invention, there is provided a method of forming a waste retention area by enclosing the waste retention area by bunds; the bunds comprising at least one substantially vertical structural element relative a base extending over a portion of a ground surface; the method including the steps of:
- preparing footings,
- placing on the footings bunds formed of panels in double rows spaced at a predetermined separation to enclose the waste retention area,
- installing an impervious liner to cover a ground surface of the waste retention area; the liner extending at least to a base of inward facing surfaces of inward facing panels of the double rows of panels, and
- wherein the bunds are retained in a selected position by interaction with a mass of compacted material.

Preferably, each panel is provided with at least one retaining element; the at least one retaining element projecting from an inner surface of the panel and extending at least across a part of the predetermined separation between the double rows of panels.

Preferably, the retaining element is provided at a distal end with a projection adapted for a bolted connection of the retaining element to the inner surface of an opposing panel of a double row of panels.

Preferably, the retaining element is provided at a distal end with a projection to form a soil anchor.

Preferably, the method includes the step of securing the distal ends of the retaining structures to the opposing panels.

Preferably, the method includes the further step of filling space between the double rows of panels with a back fill material.

In a further broad form of the invention, there is provided a method of forming a waste retention area by enclosing the waste retention area by bunds; the bunds comprising at least one substantially vertical retaining structure relative a base extending over a portion of a ground surface; the method including the steps of;
- positioning retaining structures on the ground surface to form an enclosed area; horizontal base panels of the retaining structures facing inwards to the enclosed area,
- welding overlap portions of sealing elements at adjacent vertical and horizontal joints between adjoining retaining structures,
- placing an impervious liner over the ground surface of the enclosed area,
- welding edges of the impervious liner to edges of sealing elements at inward edges of the horizontal base panels.

Preferably, the retaining structures comprise substantially "L"-shaped retaining structures.

Preferably, the retaining structures comprise inverted "T"-shaped retaining structures.

BRIEF DESCRIPTION OF DRAWINGS

Embodiments of the present invention will now be described with reference to the accompanying drawings wherein.

DESCRIPTION OF EMBODIMENTS

Figure 1:
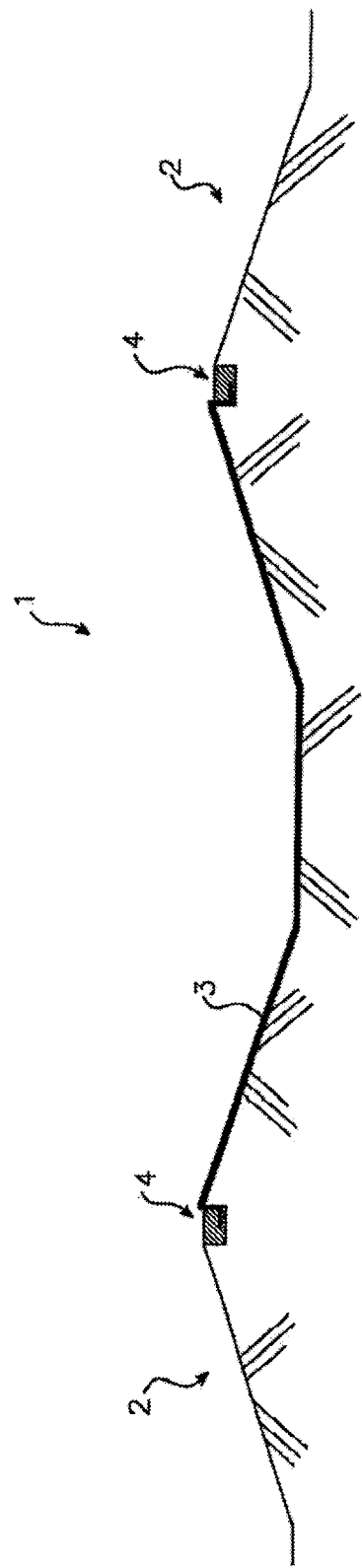
FIG. 1 is a cross section view of a typical bund structure according to the prior art, for retaining waste material.

As can be seen from FIG. 1, a conventional land fill cell or containment dam 1 is surrounded by bunds 2 formed by earth embankments with side slopes typically at 1V:3H. These embankments demand a very large footprint relative the actual volume of waste material which can be accommodated. Again conventionally, both the ground surface within the area and the sloping sides of the bunds are covered by an impervious liner 3, exposed to the elements, retained at the top of the bunds in perimeter anchor trenches 4.

First Preferred Embodiment

Figure 2:
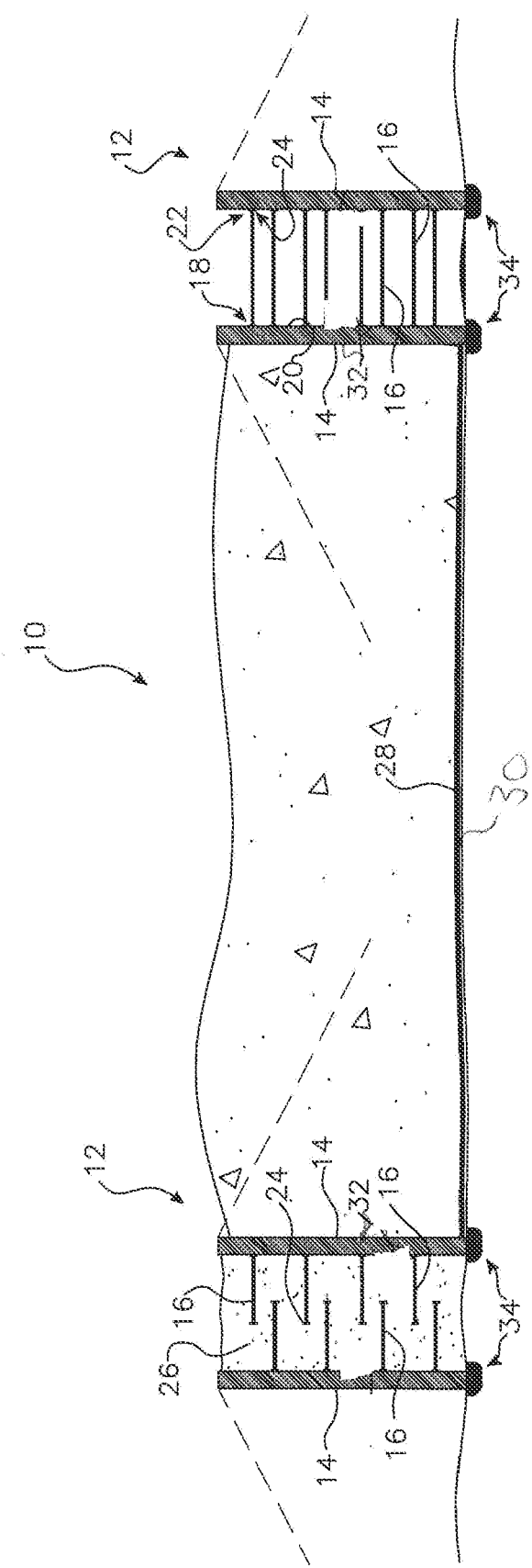
FIG. 2 is a cross section view of a bund system for retaining waste material according to a preferred embodiment of the invention.

Turning now to FIG. 2, a bund system 10 according to a first preferred embodiment of the invention, is formed of bunds 12 comprising a double row of spaced apart, substantially vertical panels 14 forming retaining structures. The panels 14 are maintained in a substantially vertical and spaced apart position by one or more retaining elements 16 which project from each panel 14 of the row of the double row of panels towards the opposite row.

In one preferred form of this embodiment of the invention and shown in the bund 12 at the right in FIG. 2, the retaining elements 16 are rods which interconnect the panels of one row with panels of the opposite row. In this arrangement, a first proximate end 18 of a retaining element is affixed at an inner surface 20 of the spaced apart, substantially vertical panels. A second distal end 22 of each of the rods is provided with a projecting structure 24 extending beyond a periphery of the end of the rod. In this preferred embodiment, the projecting structure 24 is adapted for a bolted connection to anchor points (not shown) provided at inner surfaces of the panels 14.

In another preferred arrangement as shown in the bund 12 at the left in FIG. 2, the retaining elements 16 extend from the inward facing surface of panels 14 across only a portion of the spacing between the double rows of panels. In this arrangement the projecting structures 24 are adapted to form soil anchors. After erection of the double row of panels at a predetermined separation, the space between the rows is filled with a back fill material 26, effectively locking the panels into their substantially vertical position by the soil anchor projecting structures 24 engaging with the back fill material 26.

In each of the above arrangements, the mass of back-fill compacted material introduced between the opposing panels forming the bunds, acts to retain the bunds in a selected position on a ground surface.

Figure 2A:
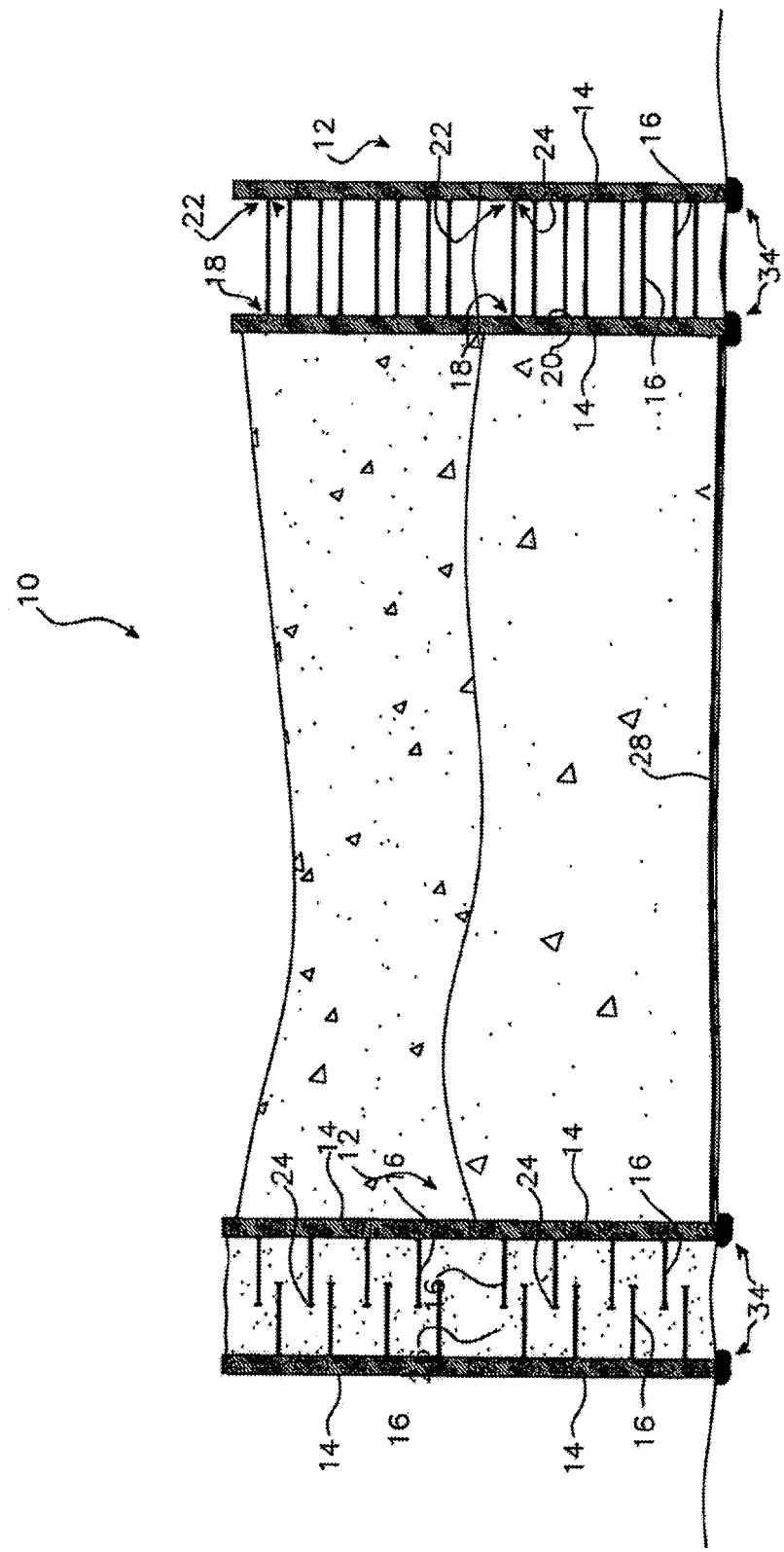
FIG. 2A is a further cross section view of the system of FIG. 2 showing a second stage of a containment for waste material.

As shown in FIG. 2A, at least a second tier of bunds may be erected on the first to double the capacity of waste material which can be retained.

Second Preferred Embodiment

Figure 3:
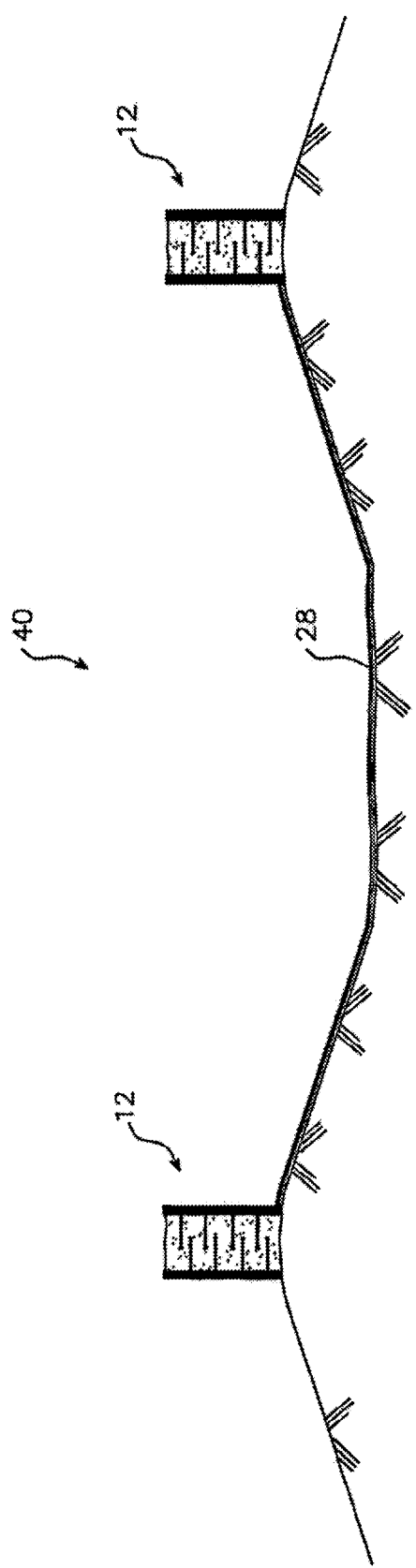
FIG. 3 is a cross section view of the bunds of FIG. 2 erected to increase the retaining height of an existing earth constructed bund system according to a further preferred embodiment of the invention.
Figure 4:
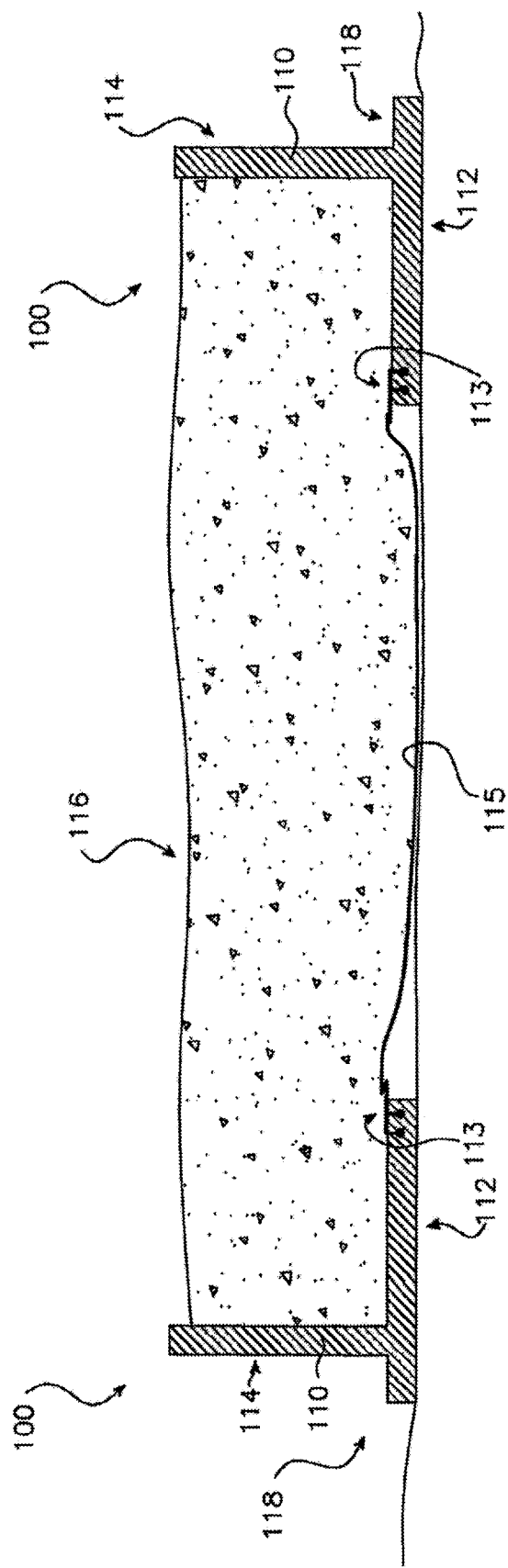
FIGS. 4 and 5 are side views of further embodiments of systems for retaining solid or liquid waste pourable material.
Figure 5:
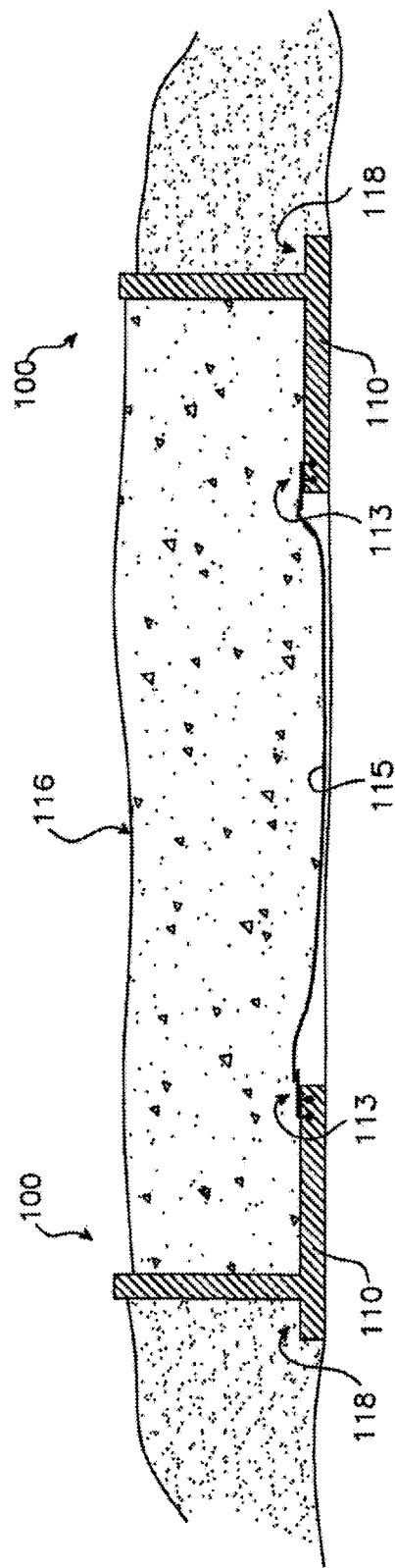

In this second preferred embodiment as shown in FIG. 3, a bund system is again comprised of rows of spaced apart, substantially vertical panels as described for the first embodiment above. As in that first embodiment, the panels are retained in their substantially vertical position by retaining elements, either interconnecting opposing panels or locked into back fill introduced into the space between the panels.

Figure 9:
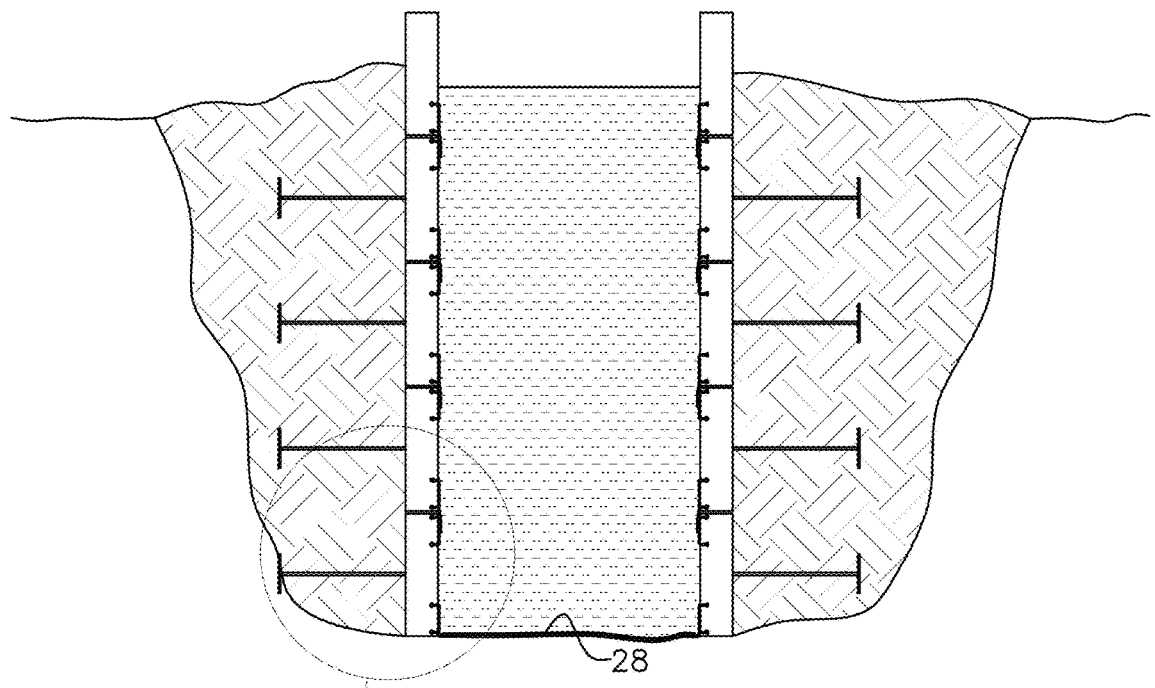
FIGS. 9 and 9A shows an arrangement of welding outer edges of a seal element to lower edges of sealing elements along lower edges of vertical retaining panels as disclosed in WO2014/205495.
Figure 9A:
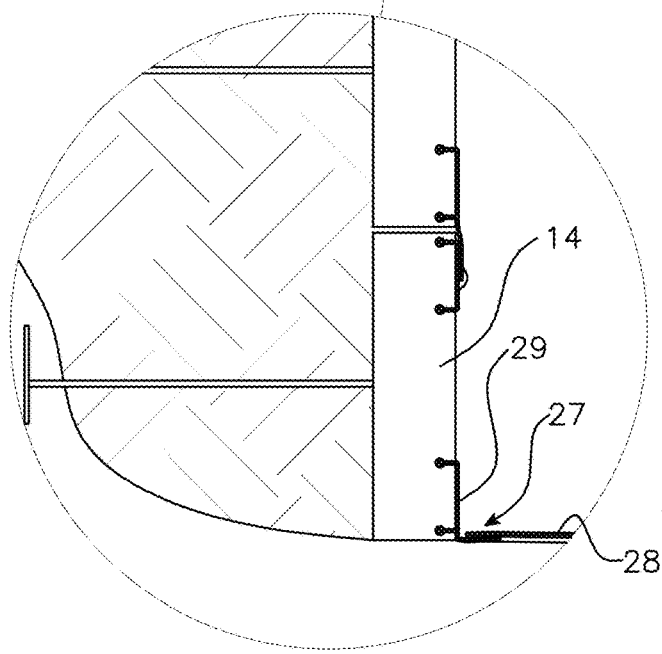

In this second embodiment however, the bunds may be used to raise the retaining height of an existing, earth construction bund 40. In this arrangement, the original liner may be replaced by one which extends up the outer surfaces of the inward facing panels of the inward facing row of panels 14 forming the added bund. Alternatively, the outer edges 27 of the liner 28 may be welded to a seal element 29 at the lower edge of the panels as described in WO 2014/205495 by the applicant, incorporated herein by reference, and as shown in FIGS. 9 and 9A.

In each of the above embodiments, the panels 14 are preferably of precast concrete. As with conventional waste retaining areas (and as shown in FIG. 1), in the bund system 10 of the invention also, an impervious liner 28 covers the ground surface 30 enclosed by the bunds 12 and may extend up the inward facing surfaces 32 of the inward facing row of panels 14.

Figure 10:
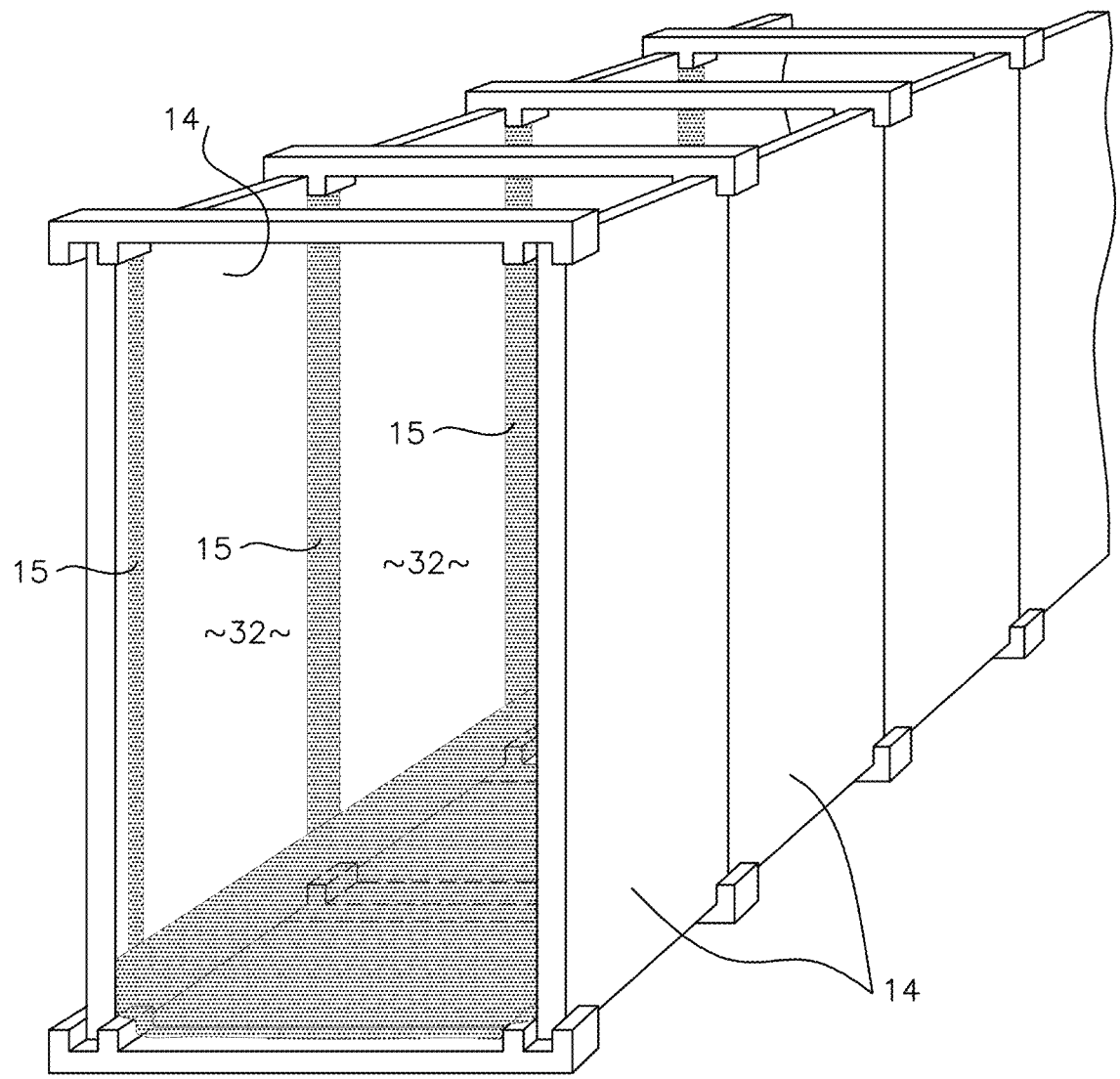
FIG. 10 shows vertical sealing elements arranged along joints between vertical retaining panels as disclosed in WO2014/205495.

In an alternative arrangement, the precast concrete panels 14 may be inherently impervious. In this case the vertical joints between adjacent panels 14 may be sealed with flexible seal members in the manner described in WO 2014/205495 and as best seen in FIG. 10. In that arrangement, each of opposite ends of concrete panels is respectively provided with one of two flexible seal members, the overlap portion of one of them at a first end of one panel welded to a surface component at the second and adjoining end of an adjacent panel.

Preferably, footings 34 are prepared and the two rows of panels 14 of lengths of bund system 10 are erected at a predetermined spacing and temporarily held in a substantially vertical position by suitable supports. At least one retaining element 16 is then affixed to the inward facing surface of each panel. Where the retaining elements are provided with projecting structures adapted for bolted connection to anchor points on opposing panels, the rows of panels will have been arranged with a separation equal to the length of the retaining elements and these projecting structures and then bolted into position. The supports may then be removed, the bund now self-supporting, the mass of the waste material acting to retain the bund formed in the selected position.

Where the retaining elements are provided with soil anchor projections, the rows of panels are arranged at a separation at which the retaining elements extend only a part way across the width of the separation. Suitable compacted back fill is then introduced into the space between the rows, the soil anchors locking the panels forming the bund into their substantially vertical position.

It can be seen from the dashed lines in FIG. 2 that the bund system of the invention provides for a very significant increase in the volume of waste material which can be accommodated compared with that of a conventional, earth construction bund of similar dimensions.

In each of the above described embodiments, adjacent vertical edges of adjoining inward facing panels 14 of the spaced apart, substantially vertical panels are respectively provided with sealing elements 15 of the type described in WO 2014/205495 and as shown in FIG. 10 to form a continuous impervious barrier.

Third Preferred Embodiment

Figure 6:
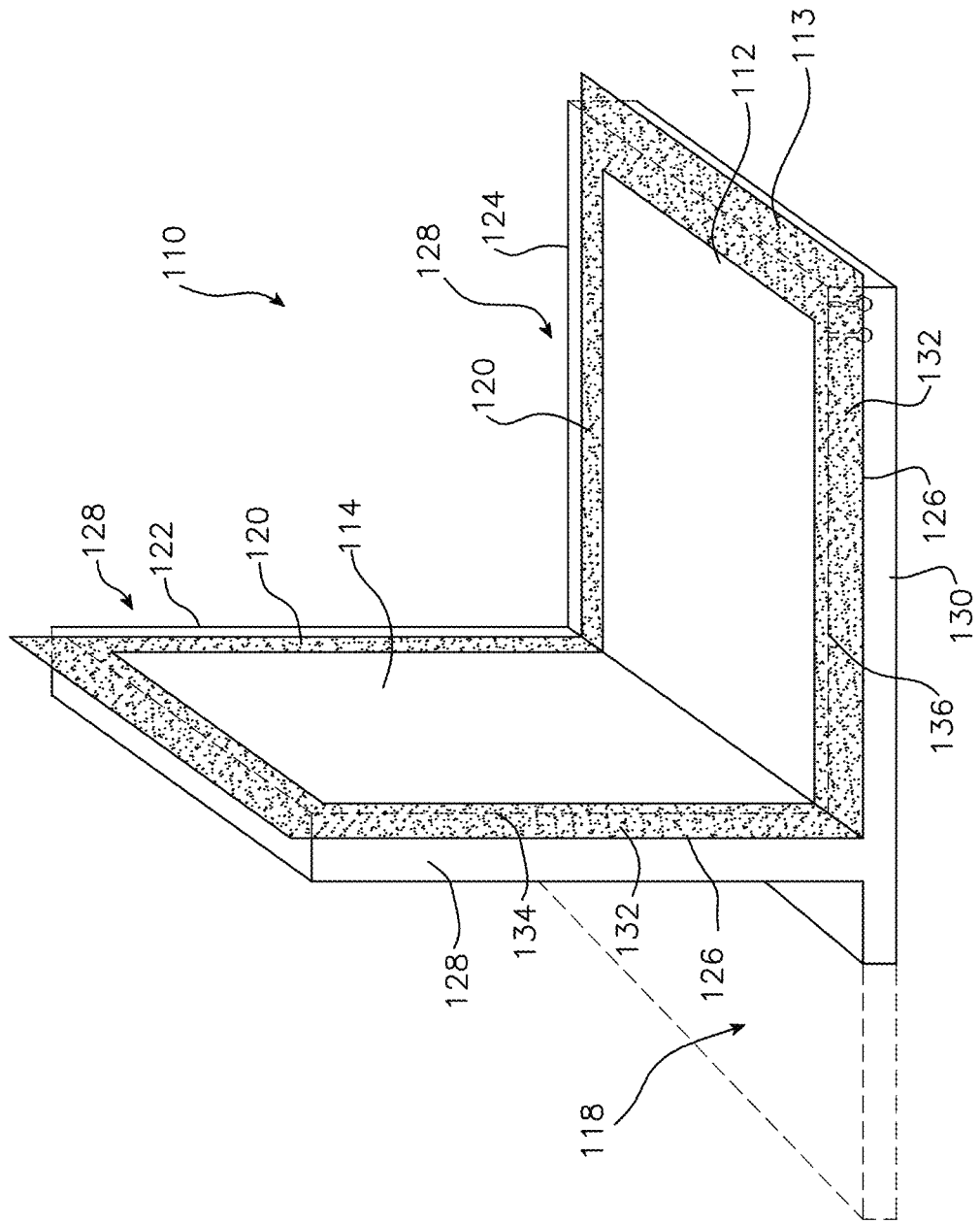
FIG. 6 is a perspective view of a retaining element of the systems of FIGS. 4 and 5.
Figure 7:
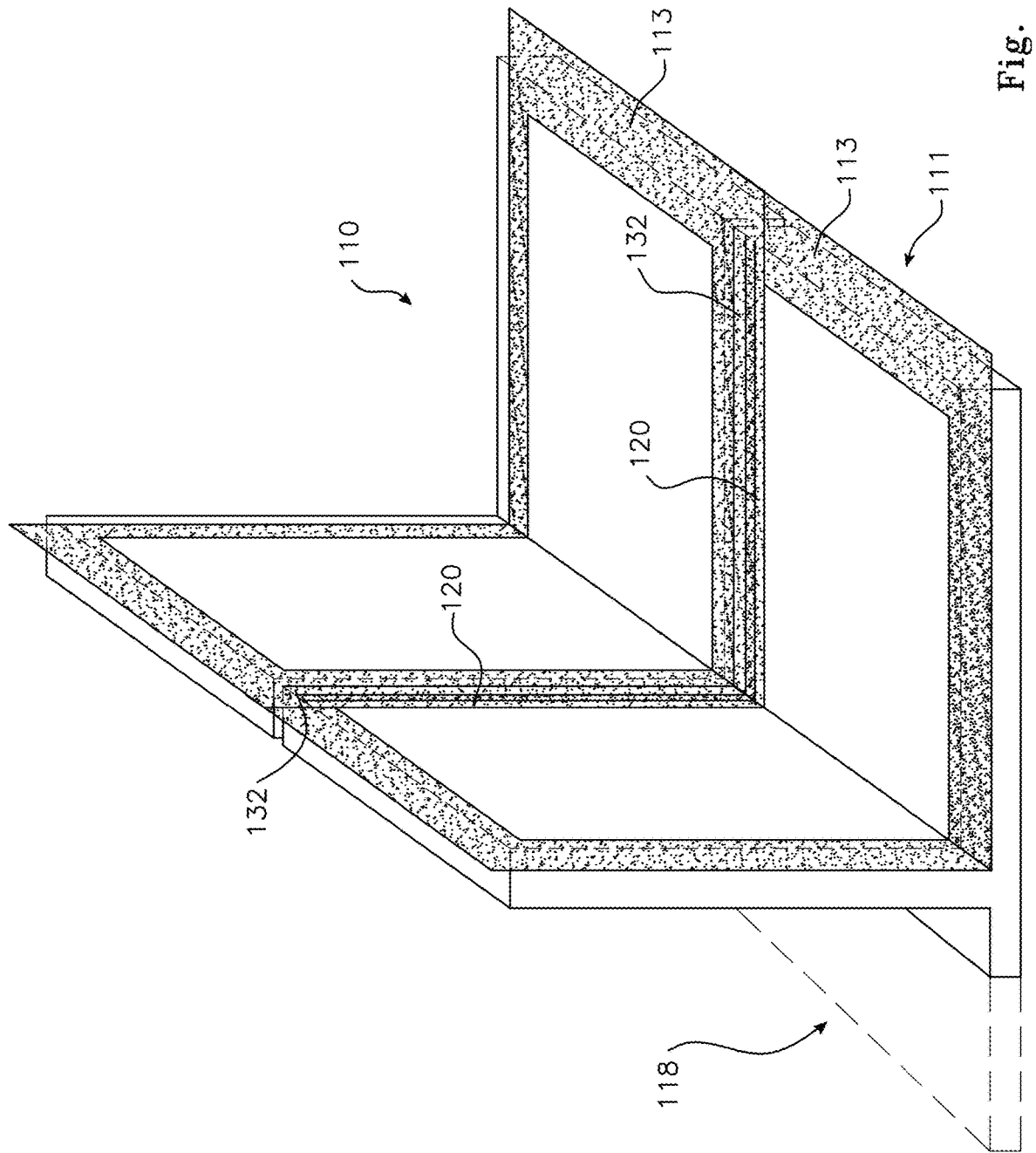
FIG. 7 is a perspective view of two of the retaining structures of FIGS. 4 to 6 showing a sealing arrangement.

In this third preferred embodiment with reference to FIGS. 4 to 7, bunds 100 according to the invention are formed as lines of precast, substantially "L" or "T"-shaped retaining structures 110, each including a horizontal base panel 112 and a vertical panel 114 extending upwards from an edge of the horizontal base panel. Preferably, base panel 112 may extend beyond the vertical panel 114, as shown in FIGS. 6 and 7, with the extension 118 even tending towards the retaining structure taking the form of an inverted "T"-shaped retaining structure. Waste or liquid material 116 is retained between opposing lines of the "L"-shaped retaining structures 110 with the opposing lines arranged with the horizontal panels 112 facing inwards one towards another.

It will be understood that the bunds 100 are retained in this instance by a combination of the mass of the waste material, either solid or liquid acting on the horizontal base panels 112, and the resistance to tipping provided by the extension 118.

As shown in FIG. 6, the substantially "L" or "T"-shaped retaining structures 110 are also provided with sealing elements to make a line of the retaining structures form an impervious barrier. These sealing elements again conform to the two forms of sealing element disclosed in WO 2014/205495. These sealing elements include sealing elements 113 arranged along the inward or outward facing edges of the horizontal base panels 112, and provided for an impervious liner 115 extending between the retaining structures 110 and heat welded to the sealing elements 113.

As can be seen from FIGS. 6 and 7, adjacent vertical and horizontal edges of adjoining substantially "L"-shaped retaining structures 110 are respectively provided with one of two forms of flexible sealing elements. A first form 120 comprising a strip of flexible polymer material overlays vertical and horizontal surface sections of an "L"-shaped retaining structure 110 proximate adjacent vertical and horizontal edges 122 and 124. The second form 126 comprising another strip of flexible polymer material overlays vertical and horizontal surface portions of the "L"-shaped retaining structure proximate opposite vertical and horizontal edges 128 and 130 and includes an overlap portion 132 extending past the adjacent vertical and horizontal edges 134 and 136.

As shown in FIG. 7 the overlap portion 132 of a first retaining structure 110 of two adjacent retaining structures 110 and 111, partially overlaps the strip of polymer sealing element 120 allowing its edge to be heat welded to the sealing element 120.

Figure 8:
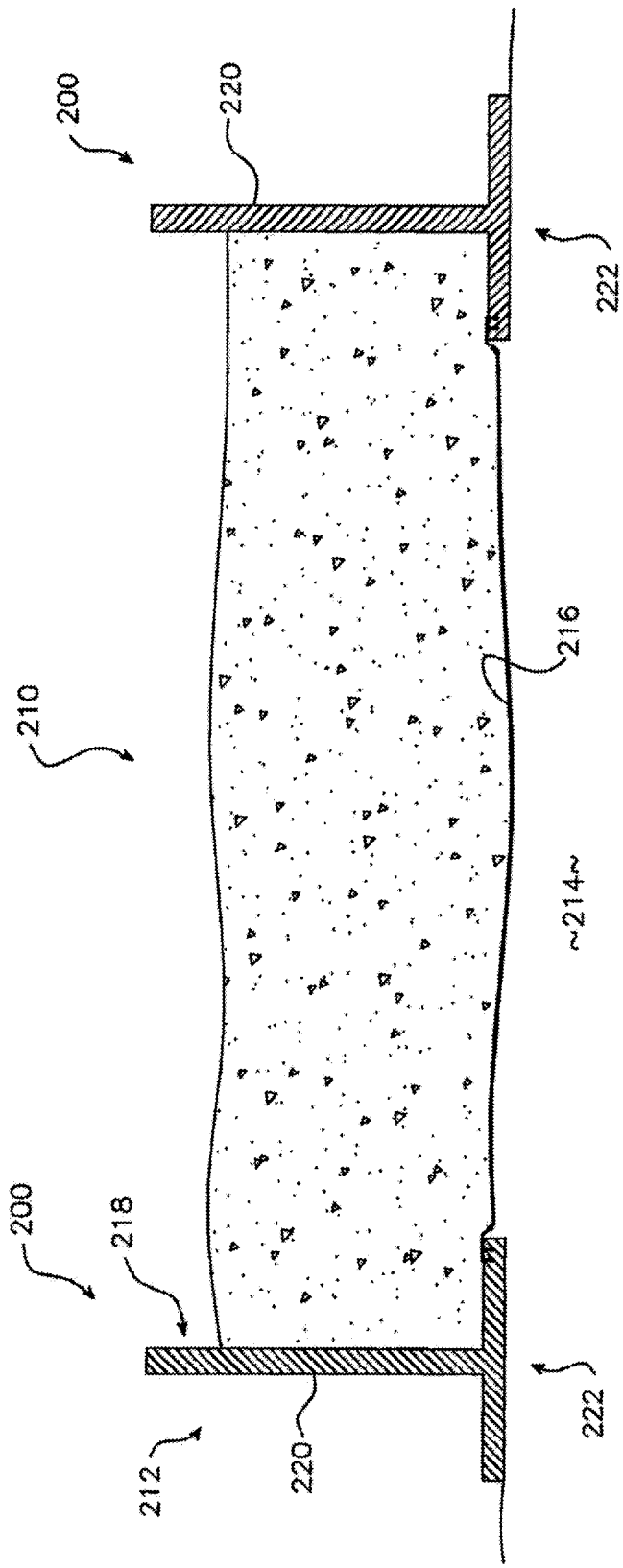
FIG. 8 is a cross section of a further embodiment of a bund system according to the invention.

With reference now to FIG. 8, bunds 200 for enclosing a land fill cell 210 are formed from precast concrete, as inverted "T"-shaped bund structures 212, in which the substantially vertical panel 220 extends upward from the midpoint of the substantially horizontal base panel 222.

In this example, the ground surface 214 of the cell or dam 200 is provided with an impervious liner 216 which, extends over the ground surface between the structures and is thermally welded to sealing elements provided along the inward facing edges as described above. Vertical joints between adjacent bund structures 212 are sealed by the sealing system described above.

The height of the substantially vertical panel 220 of the "T"-shaped bund structures 212, and the width of the substantially horizontal base panel 222 are selected so as to be able to retain the mass of waste material 224 between the surrounding bund structures.

Stability of the bund structure may therefore be assured by selecting an optimum configuration of the base panel relative the vertical panel either as substantially "L"-shaped or as an inverted "T"-shape.

In Use

A solid or liquid waste retention area may be formed by arranging on a ground surface retaining elements according to any of the above embodiments to form an enclosed area. In the case of substantially "L"-shaped and "T"-shaped retaining elements, these are positioned with horizontal base panels of the retaining structures facing inwards to the enclosed area.

Overlap portions of sealing elements at adjacent vertical and/or horizontal joints between adjoining retaining structures are then heat welded, An impervious liner is placed covering the enclosed ground surface and the edges of the liner welded to edges of sealing elements at the inward edges of the horizontal base panels of the retaining structures. In the embodiment of retaining structures formed as spaced apart vertical panels, the edges of the impervious liner are welded to sealing elements provided at the lower edges of the inward facing panels.

Although in the above description reference has been made to the retaining structures forming a perimeter about a waste material retaining cell, it will be understood that the retaining structures may additionally function as internal dividers in such a waste cell. Moreover, the retaining structures of the invention may be used for example for a tank farm fuel perimeter.

INDUSTRIAL APPLICABILITY

In each of the above described embodiments, the bund structures rely on a wide base element with at least one vertical retaining structure. Also common to each of these embodiments is that the structures are retained in a position on a ground surface by the interaction of the structure with a mass, be that mass a back fill as in the first and second preferred embodiments, or is comprised of a portion of the retained waste material, as in the third and fourth embodiments.

The ability of the bund structures of the present invention to retain waste material with elements having a far smaller footprint than that of bunds of the prior art provides for a very considerable reduction in the ecological impact of land fill cells, both through the reduced space required and the greater efficiency in the sealing against ground water pollution.

It will be understood that the various retaining structures provided with the sealing arrangements of WO 2014/205495 at vertical and horizontal edges of the structural elements described above may be applied to a waste cell according to an embodiment of the invention and may hold either solid, liquid or a combination of solid and liquid waste.

The invention claimed is:

1. A bund system (10) for the retention of solid or liquid or pourable waste material within an enclosed area; the bund system comprising:
(a) at least a first tier of retaining structures comprising a plurality of retaining structures that form a plurality of bunds (12), each of the plurality of retaining structures comprising
(i) a double row of spaced apart panels (14) disposed parallel to one another and disposable in a substantially vertical position with respect to a ground surface; and
(ii) one or more retaining elements (16) connected to an inner surface of each of the respective spaced apart panels and extending across a portion of the space between the panels; the one or more retaining elements (16) being provided with projecting structures (24) that project vertically with respect to the ground surface; the projecting structures (24) being constructed and arranged to engage with backfill material (26) to form soil anchors which effectively lock the panels in the substantially vertical position with respect to the ground surface when the space between the double rows of spaced apart panels is filled with the backfill material; wherein, with the panels disposed in the substantially vertical position with respect to the ground surface, the one or more retaining elements (16) are disposed in a horizontal position with respect to the ground surface; and
b) means for retention of the solid or liquid or pourable waste material within the enclosed area; the means for retention comprising a plurality of sealing elements disposed horizontally and vertically respectively with respect to the ground surface when the panels are disposed in the substantially vertical position with respect to the ground surface.

2. The bund system of claim 1 wherein the one or more retaining elements are in the form of rods; each of the rods having a first end that is affixed to the inner surface of one of the spaced apart panels.

3. The bund system of claim 1 wherein an impervious liner (28) covers a ground surface (30) enclosed by the plurality of bunds (12).

4. The bund system of claim 3 wherein the impervious liner (28) extends up inward facing surfaces of inward facing rows of the double row of spaced apart panels (14).

5. The bund system of claim 3 wherein outer edges of the impervious liner (28) are welded to portions of the plurality of sealing elements disposed at lower edges of inward facing rows of the double row of spaced apart panels.

6. The bund system of claim 1 wherein the retaining structures raise the retaining height of an existing earth constructed bund (40).

7. The bund system of claim 6 wherein a second tier of retaining structures is erected on the first tier of retaining structures to provide the bund system with a doubling of capacity of waste material to be retained.

8. The bund system of claim 1 further comprising
(c) backfill material filling the space between the double rows of spaced apart panels, the backfill material locking the panels in the substantially vertical position with respect to the ground surface.

9. A method of forming a bund system for the retention of solid, liquid or pourable material in an enclosed area; the method including the steps of:
(a) erecting a plurality of double rows of spaced apart parallel panels to form a plurality of retaining structures, each of the plurality of retaining structures being disposable in a substantially vertical position with respect to a ground surface; the respective panels in each of the plurality of retaining structures comprising retaining elements connected to and extending from inward facing surfaces of the respective panels partially across the space between the respective panels, the retaining elements of each retaining structure being disposed with respect to the respective panels of the retaining structure such that, when the panels are disposed in the substantially vertical position with respect to the ground surface, the retaining elements are disposed in a horizontal position with respect to the ground surface; the retaining elements of the respective panels being provided at their outer ends with projecting structures forming soil anchors which are constructed and arranged to engage with backfill material to maintain the respective panels in spaced apart position and to effectively lock the respective panels in a substantially vertical position with respect to the ground surface;
(b) backfilling the space between each of the double rows of spaced apart panels with backfill material to effectively lock the panels in a substantially vertical position with respect to the ground surface, and
(c) sealing horizontal and vertical spaces within the bund system with sealing elements to prevent the solid, liquid or pourable material from leaving the enclosed area.

10. The method of claim 9 wherein the sealing step (c) comprises extending an impervious liner over a ground surface enclosed by the bund system.

11. The method of claim 10 wherein the impervious liner extends at least partially up along inward facing surfaces of inward facing rows of the substantially vertical panels.

12. A method of doubling the capacity of the bund system according to claim 1; the method including the steps of:
(a) erecting a second tier of retaining structures atop the first tier of retaining structures, the second tier of retaining structures comprising (i) a plurality of second tier panels with inward facing surfaces spaced apart from each other, and (ii) a plurality of second tier retaining elements connected to respective of the inward facing surfaces of the second tier panels and extending partially across a space between the plurality of second tier panels, each of the plurality of second tier panels being disposed in a substantially vertical position with respect to the ground surface; the second tier retaining elements being disposed in a horizontal position with respect to the ground surface; the second tier retaining elements being provided with projecting structures projecting vertically and forming soil anchors which are constructed and arranged to engage with backfill material to maintain the respective panels in spaced apart position and to effectively lock the respective panels in the substantially vertical position with respect to the ground surface; and
(b) backfilling the space between the second tier panels of the second tier retaining structures with backfill material to effectively lock the second tier panels in the substantially vertical position with respect to the ground surface.

13. A method of raising the height of the bund system according to claim 1; the method including the step of:
erecting double rows of spaced apart, substantially vertical panels on the first plurality of retaining structures.

* * * * *